(12) United States Patent
Rezgui et al.

(10) Patent No.: US 8,061,219 B2
(45) Date of Patent: Nov. 22, 2011

(54) FLOW RESTRICTION INSERT FOR DIFFERENTIAL PRESSURE MEASUREMENT

(75) Inventors: Fadhel Rezgui, Bievres (FR); Gilles Roux, Sainte Genevieve des Bois (FR); Robert Ingham, Paris (FR); Jim Filas, Saint Cloud (FR); Yves Manin, Le Plessis Robinson (FR); Eric Donzier, Bercheres sur Vesgre (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 74 days.

(21) Appl. No.: 12/715,478

(22) Filed: Mar. 2, 2010

(65) Prior Publication Data

US 2011/0214498 A1    Sep. 8, 2011

(51) Int. Cl.
*G01F 1/44* (2006.01)
(52) U.S. Cl. .................................. 73/861.63
(58) Field of Classification Search ............ 73/861.63, 73/861.61, 122; 166/370, 372, 316, 381
See application file for complete search history.

(56) References Cited

U.S. PATENT DOCUMENTS

| | | | |
|---|---|---|---|
| 4,757,709 A | 7/1988 | Czernichow | |
| 5,297,634 A * | 3/1994 | Loughlin | 166/387 |
| 5,736,650 A | 4/1998 | Hiron et al. | |
| 6,314,821 B1 | 11/2001 | Allan | |
| 6,935,189 B2 | 8/2005 | Richards | |
| 6,993,979 B2 | 2/2006 | Segeral | |
| 7,108,071 B2 * | 9/2006 | Freiheit et al. | 166/373 |
| 7,299,880 B2 * | 11/2007 | Logiudice et al. | 166/381 |
| 7,819,194 B2 * | 10/2010 | Tips | 166/316 |
| 7,819,197 B2 * | 10/2010 | Khoshnevis et al. | 166/372 |

FOREIGN PATENT DOCUMENTS

| | | |
|---|---|---|
| EP | 923710 | 1/2004 |
| EP | 2072971 | 6/2009 |

* cited by examiner

*Primary Examiner* — Jewel V Thompson
(74) *Attorney, Agent, or Firm* — Matthias Abrell; Darla Fonseca; Jeff Griffin

(57) ABSTRACT

A flow rate device for measuring the flow rate of a fluid flowing through a wellbore is disclosed. The flow rate device includes a differential pressure conduit, a flow restrictor insert and a differential pressure measurement device. The differential pressure conduit is locatable in the wellbore, defines an internal bore, and is adapted to include a restriction having a cross-sectional area to increase the velocity of fluid flowing through the differential pressure conduit to create a differential pressure. The differential pressure conduit defining first and second pressure measuring stations axially spaced along the differential pressure conduit. The flow restrictor insert is located in the restriction to reduce the cross-sectional area of the restriction. The flow restrictor insert defines an internal bore having a cross-sectional area less than the cross-sectional area of the restriction. The flow restrictor insert also has a pressure measuring port aligned with the second pressure measuring station. The differential pressure measurement device has at least one pressure sensor for detecting the pressure at the first pressure station, and for detecting the pressure at the second pressure station to generate a signal indicative of the flow rate of the fluid.

17 Claims, 6 Drawing Sheets

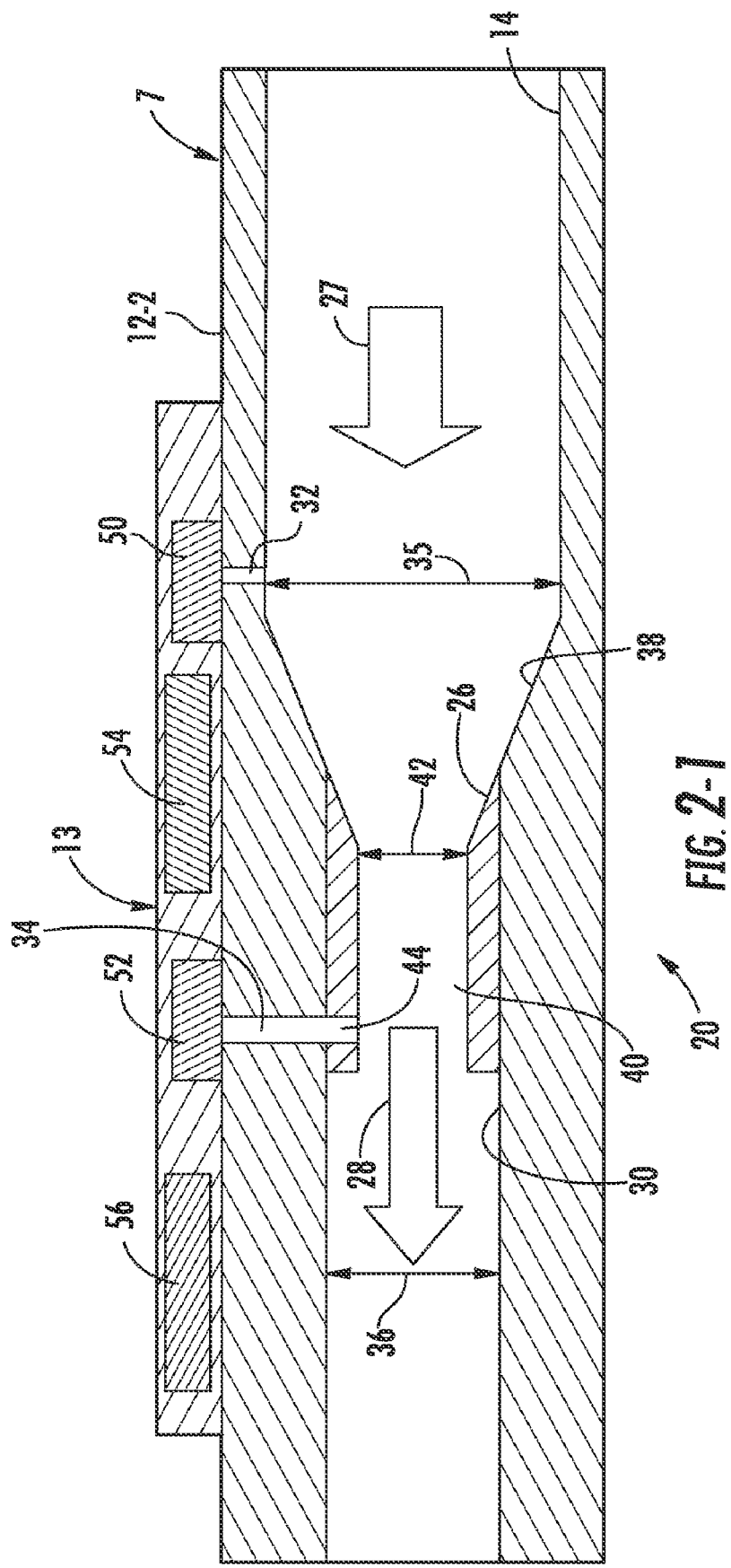
FIG. 2.1

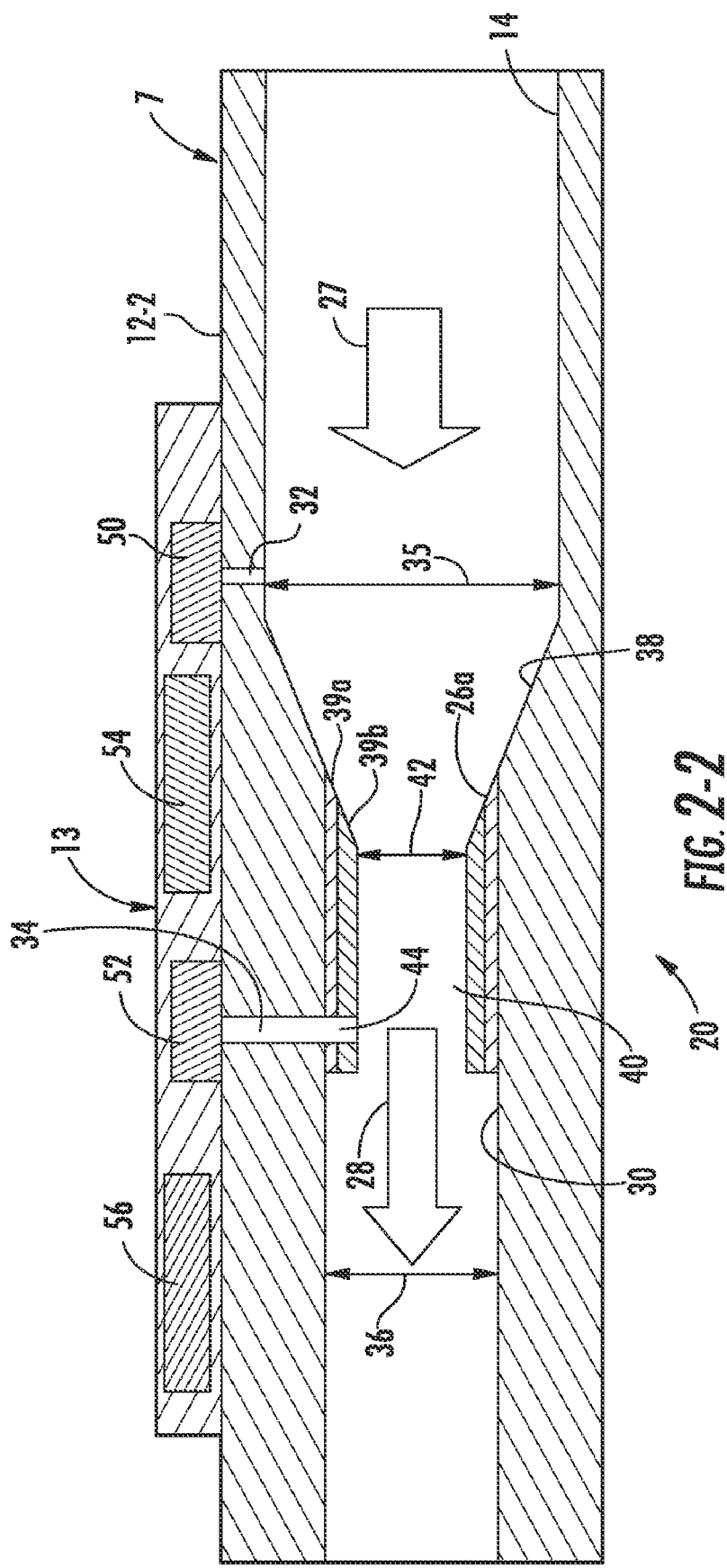

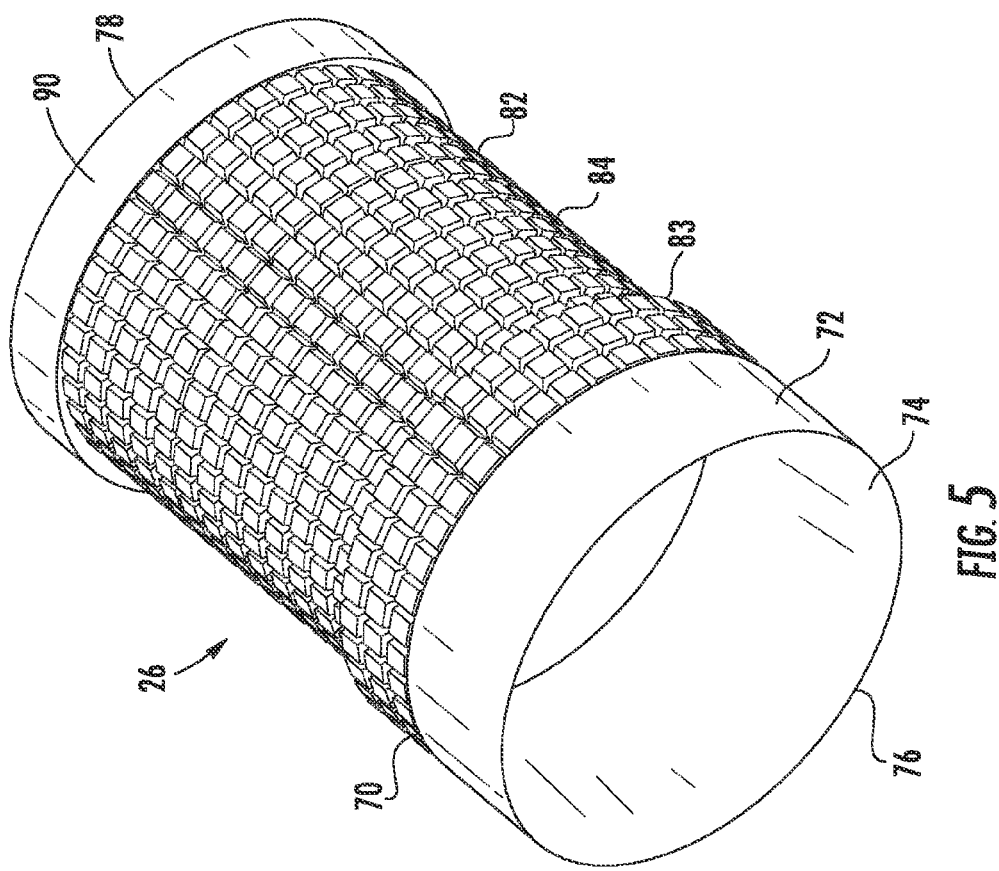
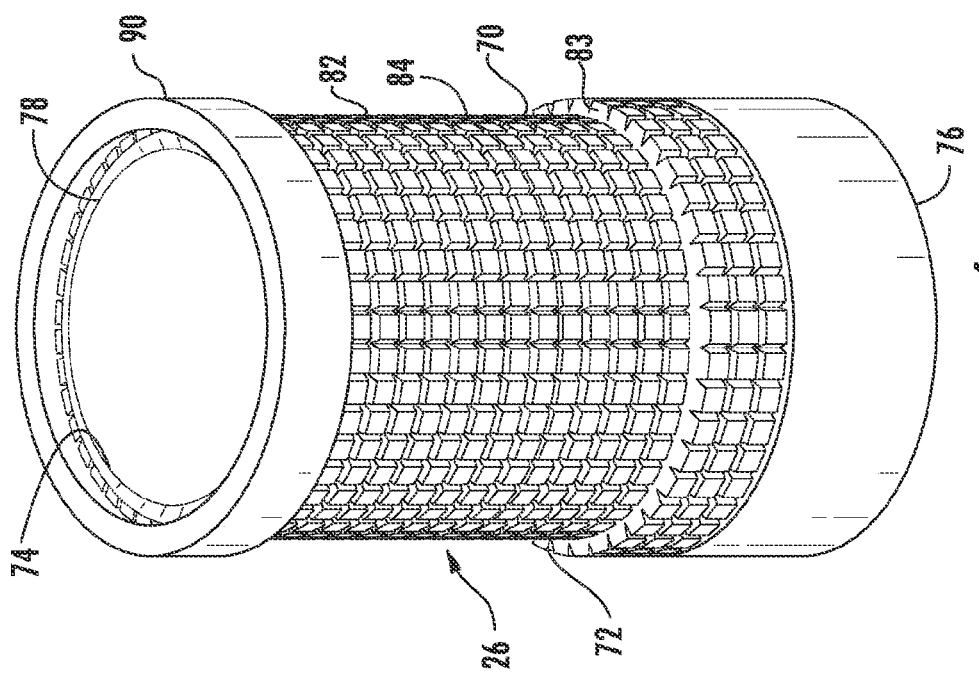

FLOW RESTRICTION INSERT FOR DIFFERENTIAL PRESSURE MEASUREMENT

BACKGROUND

1. Technical Field

The present invention relates to an apparatus and method for improving the sensitivity of a flow rate device measuring the flow rate of a fluid in a hydrocarbon well. More particularly, but not by way of limitation, the present invention relates to a flow restrictor insert that can be installed in a restriction of a differential pressure measurement device to increase the velocity of the fluid as it passes through the restriction and can be permanently removed by destruction while maintaining the operability of the flow rate device albeit at a lower sensitivity.

2. Background Art

Flow rate devices, or flow meters, are widely used in the oil and gas, and petrochemical industries. The ability of the oil and gas industry to optimize production of a reservoir relies on the possibility of evaluating the well effluent (i.e. oil, gas and water), at regular intervals, in terms of quantity (flow rate) and of composition (the proportions of the various phases).

There are a number of current systems available to measure the fluid flow rate flowing from a well, but few, if any, of them can be constructed "in-line," to allow reliable, unobtrusive measurements to be taken within the wellbore at a location near the reservoir. Most flow rate measurement systems are installed at the surface of the well-site and are adapted to interpret, or measure, the flow rate of the well effluent after it has traveled from the reservoir to the surface. Furthermore, in certain systems, an in-line flow rate device measures the flow rate of a fluid in a hydrocarbon well using a differential pressure measurement device, such as a Venturi or orifice plate.

Numerous proposals based on Venturi-type flow rate devices have been made to evaluate the wellbore fluid. For example, U.S. Pat. Nos. 4,757,709 and 5,736,650, the entire contents of which are expressly incorporated herein by reference, provide that differential pressure measurement can allow a determination of fluid flow rate when combined with various physical properties of the fluid, such as density. In such proposals, it is suggested that the flow rate device can be provided with a differential pressure measurement device that measures the difference in pressure of the fluid as it flows past Venturi ports prior to and within the Venturi's restriction.

As another example, U.S. Pat. No. 7,114,401 issued on Oct. 3, 2006 is directed towards a flow measurement system using, for example, a Venturi for steady-state and transient flow rate measurement, particularly suited for the drilling domain. The '401 reference, however, measures differential pressure by measuring the radial deformation, changes in the hoop strain/stress, of a sleeve upstream and downstream of a Venturi-type section.

In a Venturi flow rate device the differential pressure ($\Delta P$) between the Venturi ports is mainly controlled by the flow velocity in the restriction, and that for a given rate, the higher the velocity, the more accurate will be the measurement. In other words, flow rate devices produce more accurate measurements when a greater pressure differential is produced, that is by going from a larger diameter to a smaller diameter. The smaller the restriction's diameter, the better the quality of the rate measurement.

As an example, U.S. Pat. No. 6,993,979 issued Feb. 7, 2006 relates to an insert device for narrowing a throat of a Venturi-based multiphase flow meter. As mentioned before, however, the flow meter of the '979 is particularly suited for installation at the surface of the well-site. Moreover, the insert device is not particularly adapted to be permanently removed by destruction so as to not interfere with wellbore operations.

Industry practice dictates that for a Drill Stem Testing operation the throat restriction should not go below 2.25 inches in order to allow for well intervention (i.e., logging, fishing, firing using a drop bar, or the like). At this throat size, the differential pressure output is less accurate at low flow rates (e.g., <2,000 bbl/d). Further, restrictions below 2.25 inches can either cause blockage or limit the selection of tools that may be used when deploying tools down/up a production well.

It is therefore desirable to provide a method and apparatus for increasing the velocity of the fluid as it passes through the restriction of the Venturi while preserving the ability to allow for well intervention. It is also desirable to measure the flow rate of the well effluent at a location near the reservoir rather than at surface, so as to disregard variables such as phase changes and gas expansion that occur as the well effluent travels across pressure and temperature differences between the reservoir and surface.

SUMMARY OF THE DISCLOSURE

In one aspect, the present invention is directed to a flow rate device for measuring the flow rate of a fluid flowing through a wellbore. The flow rate device includes a differential pressure conduit, a flow restrictor insert and a differential pressure measurement device. The differential pressure conduit is locatable in the wellbore, defines an internal bore, and is adapted to include a restriction having a cross-sectional area to increase the velocity of fluid flowing through the differential pressure conduit to create a differential pressure. The differential pressure conduit defining first and second pressure measuring stations axially spaced along the differential pressure conduit. The flow restrictor insert is located in the restriction to reduce the cross-sectional area of the restriction. The flow restrictor insert defines an internal bore having a cross-sectional area less than the cross-sectional area of the restriction. The flow restrictor insert also has a pressure measuring port aligned with the second pressure measuring station. The differential pressure measurement device may have first and second pressure sensors with the first pressure sensor measuring the pressure at the first pressure station, and the second pressure sensor measuring the pressure at the second pressure station for generating a signal indicative of the flow rate of the fluid. Alternatively, the differential pressure measurement device may have a differential pressure sensor adapted to measure the difference between the pressure at the first pressure station and the pressure at the second pressure station for generating a signal indicative of the flow rate of the fluid.

In various aspects, the differential pressure conduit may either be a Venturi or an orifice plate. In other aspects, the flow restrictor insert is destroyable, and includes a sidewall having a lower section defining an upwardly tapering portion of the internal bore. To facilitate the destruction of the flow restrictor insert, the sidewall can be provided with an outer surface defining a plurality of grooves in a grid-pattern.

In yet another aspect, the at least two pressure sensors are defined further as absolute pressure sensors measuring the local pressure of the fluid.

In a further aspect, the present invention is directed to a method for monitoring the flow rate of a fluid in a hydrocarbon well. In this version, a flow restrictor insert is installed in a restriction of a differential pressure conduit. The differential pressure conduit is placed within the hydrocarbon well and then the flow rate of the fluid is measured with the flow rate device as the fluid passes through the differential pressure conduit. To conduct a well intervention, for example, the flow restrictor insert is removed while the differential pressure conduit is within the hydrocarbon well and without disabling the flow rate device. This can be accomplished in a variety of manners, such as by destroying the flow restrictor insert with a conventional logging tool or a dedicated tool. Then, a tool is passed through the restriction of the differential pressure conduit.

In an even further aspect, the step of removing the flow restrictor insert is defined further as breaking the flow restrictor insert into a plurality of particles such that particles formed from the flow restrictor are removed from the restrictor by the fluid.

In another aspect, the present invention is directed to a flow rate device for measuring the flow rate of a fluid flowing through a wellbore. In this version, the flow rate device is provided with a differential pressure conduit locatable in the wellbore, a flow restrictor insert, and a differential pressure measurement device. The differential pressure conduit defines an internal bore, and is adapted to include a restriction having a cross-sectional area designed to increase the velocity of fluid flowing through the differential pressure conduit to create a differential pressure. The differential pressure conduit defines first and second pressure measuring stations axially spaced along the differential pressure conduit. The flow restrictor insert is located in the restriction to reduce the cross-sectional area of the restriction. The flow restrictor insert defines an internal bore having a cross-sectional area less than the cross-sectional area of the restriction. In this version, the flow restrictor insert is adapted to be destroyed for evacuation from the restriction. The differential pressure measurement device may have first and second pressure sensors with the first pressure sensor measuring the pressure at the first pressure station, and the second pressure sensor measuring the pressure at the second pressure station for generating a signal indicative of the flow rate of the fluid. Alternatively, the differential pressure measurement device may have a differential pressure sensor adapted to measure the difference between the pressure at the first pressure station and the pressure at the second pressure station for generating a signal indicative of the flow rate of the fluid. The flow restrictor insert can be constructed in a variety of manners, such as including a sidewall having a lower section defining an upwardly tapering portion of the internal bore, and/or having an outer surface defining a plurality of grooves in a grid-pattern.

These together with other aspects, features, and advantages of the present invention, along with the various features of novelty, which characterize the present invention, are pointed out with particularity in the claims annexed to and forming a part of this disclosure. The above aspects and advantages are neither exhaustive nor individually or jointly critical to the spirit or practice of the disclosure. Other aspects, features, and advantages of the present invention will become readily apparent to those skilled in the art from the following detailed description in combination with the accompanying drawings. Accordingly, the drawings and description are to be regarded as illustrative in nature, and not restrictive.

BRIEF DESCRIPTION OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

FIG. 2-1 depicts a cross-sectional view of a section of a differential pressure conduit illustrating the flow rate device constructed in accordance with an embodiment of the present invention for measuring a flow rate of a fluid flowing through or within a wellbore defined by a casing.

FIG. 2-2 depicts a cross-sectional view of a section of a differential pressure conduit illustrating the flow rate device constructed in accordance with another embodiment of the present invention for measuring a flow rate of a fluid flowing through or within the wellbore defined by the casing.

FIGS. 4 and 5 depict perspective views of another flow restrictor insert constructed in accordance with an embodiment of the present invention.

DETAILED DESCRIPTION

Specific embodiments of the present invention will now be described in detail with reference to the accompanying drawings. Further, in the following detailed description of embodiments of the present invention, numerous specific details are set forth in order to provide a more thorough understanding of the present invention. However, it will be apparent to one of ordinary skill in the art that the embodiments disclosed herein may be practiced without these specific details. In other instances, well-known features have not been described in detail to avoid unnecessarily complicating the description.

The terminology and phraseology used herein is solely used for descriptive purposes and should not be construed as limiting in scope. Language such as "including," "comprising," "having," "containing," "consisting of," or "involving," and variations thereof, is intended to be broad and encompass the subject matter listed thereafter, equivalents, and additional subject matter not recited.

Figure 1:
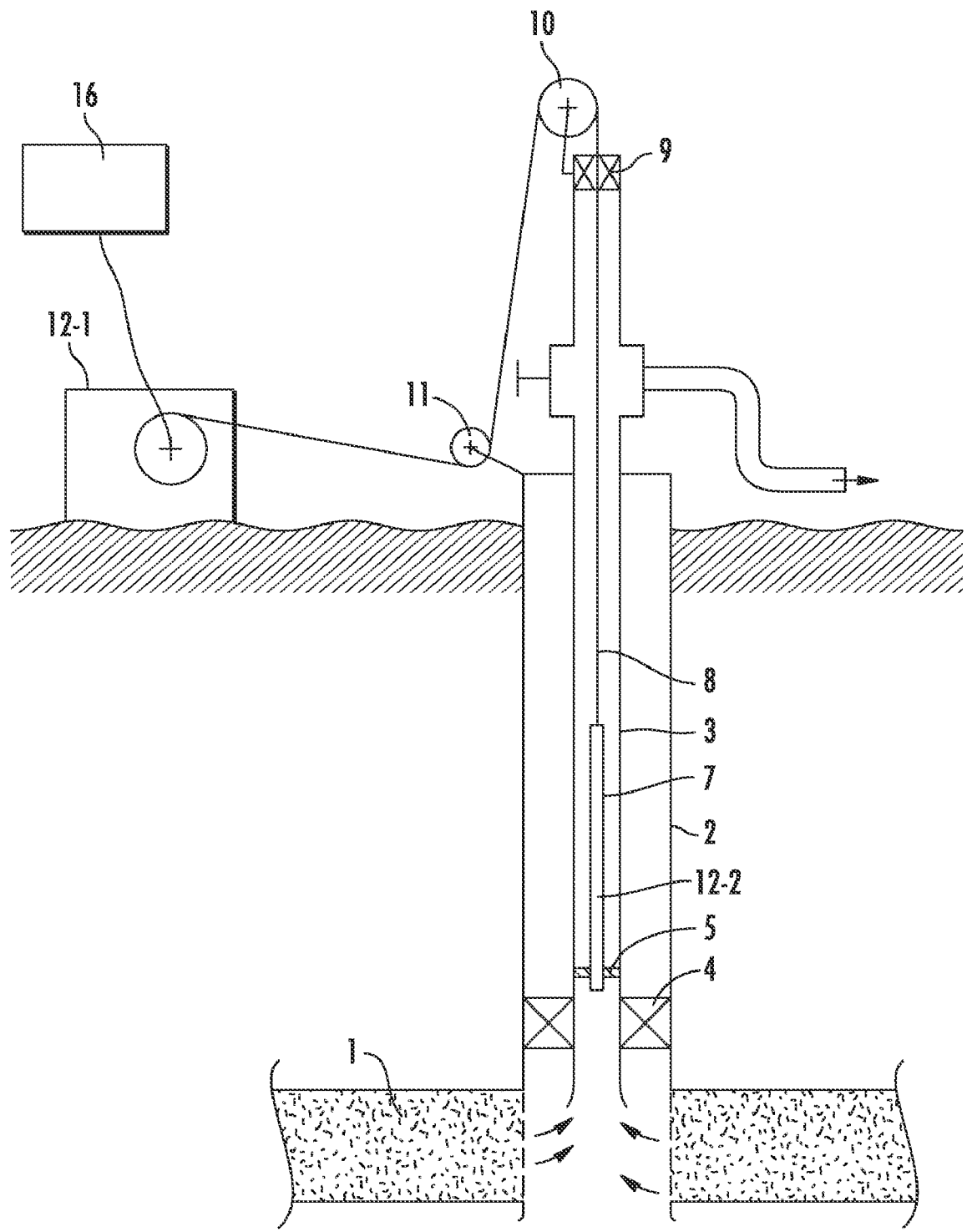
FIG. 1 depicts a flow rate device positioned in a hydrocarbon well in accordance with one aspect of the present invention.

Referring now to the drawings, and in particular to FIG. 1, shown therein is a well passing through an oil-producing zone 1 and comprising casing 2 encompassing a production string 3. An annular sealing device 4 is located between about the bottom end of the casing 2 and the production string 3.

A downhole valve shown symbolically at 5 enables the production string 3 to be closed off at will at its bottom end. The downhole valve can be an inflatable device, such as a packer, for example. A differential pressure conduit 7, which may be implemented in the form of a wireline or slickline device, is suspended from a cable 8 which emerges from the top of the production string 3 via a sealing device 9 and then passes via pulleys 10 and 11 prior to being wound onto the drum of a winch 12-1 disposed, for example, on the surface of the ground.

The differential pressure conduit 7 can be hollow and can also house measurement devices and electronic equipment associated therewith. In particular, the differential pressure conduit 7 has a section 12-2 located above the downhole valve 5 suitable for housing a differential pressure measurement device 13 (shown in FIG. 2-1) which is exposed to the pressure existing in the well below the valve 5 via one or more internal bore(s) 14 (shown in FIG. 2-1) passing through the differential pressure conduit 7.

In one aspect of the present invention, the cable 8 can be an electrical cable which, in addition to its mechanical function of suspending and actuating the device(s) housed by the differential pressure conduit 7, also conveys measurement signals to the surface, for example, the signals generated by the differential pressure measurement device 13 housed in said section 12-2. The signals may be completely or partially processed and restored by the electronic equipment housed in the differential pressure conduit 7, and/or on reaching the surface can be processed, stored, or displayed by means of a computing device 16, such as a computer system loaded with software for monitoring and tracking various downhole parameters, such as the flow rate of the fluid travelling within or through the well.

Referring now to FIG. 2-1, shown therein is a cross-sectional view of the section 12-2 of the differential pressure conduit 7 illustrating a flow rate device 20 constructed in accordance with the present invention for measuring a flow rate of a fluid flowing through or within a wellbore defined by the casing 2. In general, the flow rate device 20 is provided with the differential pressure conduit 7, one or more flow restrictor insert 26, and one or more differential pressure measurement device 13. The differential pressure conduit 7 is locatable within the wellbore such that fluid flowing within the wellbore can flow through the internal bore 14 thereof in the direction depicted by the arrows 27 and 28. The differential pressure conduit 7 is adapted to include at least one restriction 30 to increase the velocity of fluid flowing through the differential pressure conduit 7 to create a differential pressure. The relationship between flow velocity and pressure can be described as a Venturi effect—which is known in the art. The differential pressure conduit 7 can be positioned near the reservoir, e.g., the oil producing zone 1, rather than at the surface, so that the flow rate device 20 can take flow rate measurements and disregard variables such as phase changes and gas expansion that occur as the well effluent travels across pressure and temperature differences between the reservoir and surface.

The differential pressure conduit 7 defines first and second pressure measuring stations 32 and 34 that are axially spaced along the differential pressure conduit 7. The first pressure measuring station 32 is in a portion of the differential pressure conduit 7 having a relatively constant cross-sectional area 35, which is larger than a cross-sectional area 36 of the restriction 30. The cross-sectional areas 35 and 36 are designated by arrows in FIG. 2-1. It should be understood that the cross-sectional areas 35 and 36 can be provided with any suitable shapes, such as circular, elliptical, square, rectangular, star shape, or the like. The restriction 30 can be formed in any suitable manner, such as by an inwardly tapering portion 38 of the differential pressure conduit 7 positioned between the first and second pressure measuring stations 32 and 34. Although the differential pressure conduit 7 is shown as a unitary element, it should be understood that the differential pressure conduit 7 can be implemented as two or more interconnected pieces.

As will be discussed in more detail below, the sensitivity and/or accuracy of the flow rate device 20 depends upon the difference between the cross-sectional areas 35 and 36 which function to create the difference in pressure which is sensed by the differential pressure measurement device 13. The maximum size of the cross-sectional area 35 of the internal bore 14 is typically limited by either the maximum outside dimension of the differential pressure conduit 7 or the internal diameter of the production string (not shown). Current industry practice dictates that the minimum cross-sectional area 36 of the restriction 30 should be limited to about 2.25 inches for permitting well intervention by disposing tools through the restriction 30. In accordance with the present invention, at least one of the flow restrictor insert 26 can be installed in the restriction 30 of the differential pressure conduit 7 to decrease the cross-sectional area of the restriction 30, thereby increasing the velocity of the fluid passing through the flow restrictor insert 26 and increasing the difference in the pressure sensed by the differential pressure measurement device 13. In one aspect of the present invention, at least one of the flow restrictor inserts 26 is positioned within each of the restrictions 30 in which a differential pressure measurement is to be made.

The flow restrictor insert 26 is designed to be permanently removed from the restriction 30 while the differential pressure conduit 7 is downhole, and more particularly, while the flow restrictor insert 26 is located in the restriction 30 downhole. This is preferably accomplished by designing the flow restrictor insert 26 to be destroyed in a manner which causes particles from the flow restrictor insert 26 to be evacuated from the restriction 30 by the fluid flowing through the internal bore 14. For example, the flow restrictor insert 26 can be constructed of a single brittle or fracturable material, such as ceramic or glass, which breaks into particles when subjected to shock or impact. When the flow restrictor insert 26 is removed from the restriction, the flow rate device 20 can continue to function normally, albeit at a lower sensitivity or accuracy.

Shown in FIG. 2-2 is another embodiment of a flow restrictor insert 26a as part of the flow rate device 20 which is identical in construction and function as the flow restrictor insert 26, which was discussed above, except that the flow restrictor insert 26a is constructed of at least two types of material joined together where at least one of the types of materials is constructed of a brittle or fracturable material to be removed by destruction. For example, as shown in FIG. 8, the flow restrictor insert 26a can be constructed of an outer part 39a and an inner part 39b with the inner part 39b positioned within and preferably connected to the outer part 39a. The outer part 39a can be in the form of a sleeve or a plate and is constructed of a durable material such as metal, while the inner part 39b is constructed of a brittle or fracturable material. In this example, the outer part 39a would have an internal diameter of approximately 2.25 inches, and the inner part 39b would have a smaller internal diameter. In case of destruction, the outer part 39a remains and the flow rate device 20 still operates albeit at a lower sensitivity and/or accuracy.

Referring again to FIG. 2-1, as discussed above, the flow restrictor insert 26 is located in the restriction 30 and functions to reduce the cross-sectional area 36 of the restriction 30 thereby increasing the sensitivity and the accuracy of the flow rate device 20 as will be described below. The flow restrictor insert 26 defines an internal bore 40 having a cross-sectional area 42 (designated by an arrow) that is less than the cross-sectional area 36 of the restriction 30. The flow restrictor insert 26 preferably includes a pressure measuring port 44 which is aligned with the second pressure measuring station 34 such that pressure of the fluid passing through the internal bore 40 of the flow restrictor insert 26 is communicated into the second pressure measuring station 34 as shown in FIG. 2-1.

The differential pressure measurement device 13 can be constructed in a variety of manners, but is generally provided with a first pressure sensor 50, a second pressure sensor 52, electronics 54 for operating/enabling the first and second pressure sensors 50 and 52, and a power source 56, such as a battery or a device for converting movement into electrical power. In any event, the power source 56 applies electrical power to the electronics 54 which supplies power to the first pressure sensor 50, and the second pressure sensor 52. The electronics 54 also receive signals from the first pressure sensor 50, and the second pressure sensor 52 for generating a signal indicative of the differential pressure at the first and second pressure measuring stations 32 and 34. The first pressure sensor 50 measures the pressure at the first pressure measuring station 32, and the second pressure sensor 52 measures the pressure at the second pressure measuring station 34. Such measurements are transmitted to the electronics 54 for generating a signal indicative of the flow rate of the fluid.

Although not particularly shown in FIG. 2-1 or 2-2, the differential pressure measurement device 13 may be constructed to include a single differential pressure sensor adapted to measure the measure the difference between the pressure at the first pressure station 32 and the pressure at the second pressure station 34. The differential pressure sensor (not shown) can function in a similar manner as described above with reference to the first and second pressure sensors 50 and 52. The differential pressure sensor may be connected to a power source 56 and electronics 54 to generate a signal indicative of the differential pressure at the first and second pressure measuring stations 32 and 34. Wherein such measurements are transmitted to the electronics 54 for generating a signal indicative of the flow rate of the fluid.

As will be understood by one skilled in the art, the electronics 54 preferably includes a processing unit which is programmed with computer executable instructions stored on one or more computer readable medium (i.e., a memory, disk, or the like). The computer executable instructions, when executed by the processor, cause the processor to process and analyze data received from the first and second pressure sensors 50 and 52 as well as other data such as a density of the fluid to calculate or determine a flow rate of the fluid. Techniques for calculating the flow rate of the fluid using the density of the fluid and a differential pressure measurement are known in the art. See for example, U.S. Pat. No. 4,757,709, or U.S. Pat. No. 5,736,650. The data received from the first and second pressure sensors 50 and 52 and/or the data indicative of the flow rate of the fluid can be stored on one or more computer readable mediums stored downhole for retrieval at surface or may be sent to surface in real-time, or near real-time. Additionally, the data received from the first and second pressure sensors 50 and 52 can be communicated to a separate device or processing system, such as the device 16 for calculating the flow rate of the fluid. In this regard, it should be understood that the electronics 54 is also preferably provided with a communication device (not shown) for communicating with the device 16 via the cable 8, for example.

Thus, it will be appreciated that the flow restrictor insert 26 is aimed at improving the sensitivity of the flow rate device 20 based on the Venturi principle. In particular, the Venturi principle is known to be adequate for high velocity flow but lacks accuracy at the low velocities (e.g., <2,000 bbl/d) that are sometimes encountered in producing wells. Placing the flow restrictor insert 26 in the restriction 30 results in a local velocity increase where the differential pressure measurement can be performed. As mentioned hereinbefore, if required by the operator of the well, the flow restrictor insert 26 can be permanently removed by destruction, for example with a conventional logging tool or a dedicated tool. In a preferred aspect of the invention, the flow rate device 20 is still operational after destruction of the flow restrictor insert 26, but with reduced sensitivity.

As an example, for drill stem test operations where the restriction 30 has a cross-sectional area 36, the diameter of the restriction 30 should not go below 2.25 inches in order to allow for well intervention (i.e., logging, fishing, firing using a drop bar, or the like). However, by installing a flow restrictor insert 26 in the 2.25 inch diameter restriction 30, the cross-sectional area 36 can be reduced to an effective cross-sectional area 42, which may be much lower than 2.25 inches. As such, the accuracy of the flow rate device 20 can be increased at low flow rates without permanently impeding the passage of certain well intervention wireline devices or other tools passing through the restriction 30. If well intervention tools are desired which have a larger effective cross-sectional area than indicated by reference numeral 42, then a conventional logging tool or a dedicated tool can be used to break the flow restrictor insert 26 thereby returning the restriction 30 to its nominal value (e.g., 2.25 inches). With this system, even after the flow restrictor insert 26 has been destroyed the rate measurement is still possible, but with reduced sensitivity as explained above.

The cross-sectional area 42 of the internal bore 40 of the flow restrictor insert 26 should be determined before tool deployment and can vary according to completion conditions (e.g., allowed pressure drop, size of solid particles, anticipated diameter of intervention tools, expected down-hole flow rates, and the like). In general, the cross-sectional dimension of the internal bore 40 can vary between about 1 inch to about 1.9 inch, resulting in a cross-sectional area 42 between about 1 inch$^2$ to about 3.61 inch$^2$, and more preferably between about 1.5 inch$^2$ to about 2 inch$^2$.

In accordance with the Venturi principle, the differential pressure ($\Delta P$) is mainly dictated by the velocity v in the restriction 30. This is roughly given by:

$$\Delta P \propto \rho v^2 \qquad \text{(Eq. 1)}$$

where $\rho$ is the fluid density.

The flow rate is proportional to the velocity divided by the area S.

$$Q = v/S \qquad \text{(Eq. 2)}$$

Assuming a cylindrical geometry, the area at the restriction 30 is proportional to the square of the diameter d.

We can then deduce:

$$\Delta P \propto Q^2/d^4 \qquad \text{(Eq. 3)}$$

The measured differential pressure is roughly proportional to the inverse of the diameter, for example, of the restriction 30 at the power 4. When we reduce the throat diameter by a factor of 20% (for instance from 2.25 inches to 1.9 inches) we multiply the signal output ($\Delta P$) by approximately 2.

At 1 m/s and for liquid (water) the differential pressure is approximately (see equation 1):

$$1000 \text{ Kg/M}^3 * 1(\text{m/s})^2 = 1000 \text{ Pa}$$

This is about 0.15 psi which is extremely difficult to measure in down-hole conditions since the hydrostatic pressure is typically 10,000 times higher than this value. We can then reasonably say that, the smaller the diameter, the better will be the accuracy on the measured flow rates.

As such, the flow rate device 20 preferably comprises a conventional Venturi that has a destroyable flow restriction. The destroyable flow restriction is composed of the combination of permanent and destroyable components, i.e., the differential pressure conduit 7 is a permanent component and the flow restrictor insert 26 is a destroyable component.

While the flow restrictor insert 26 is designed to be easily destroyed in case of well intervention, the flow restrictor insert 26 is preferably constructed to be capable of withstanding high flow rates during production and well treatment operations (such as fracking, acidification, and the like). If destroyed, the restriction 30 goes to the nominal value, e.g., 2.25 inches, and the flow rate device 20 is still operational. Of course, in such a situation, as explained above, the flowmeter looses sensitivity.

Figure 3:
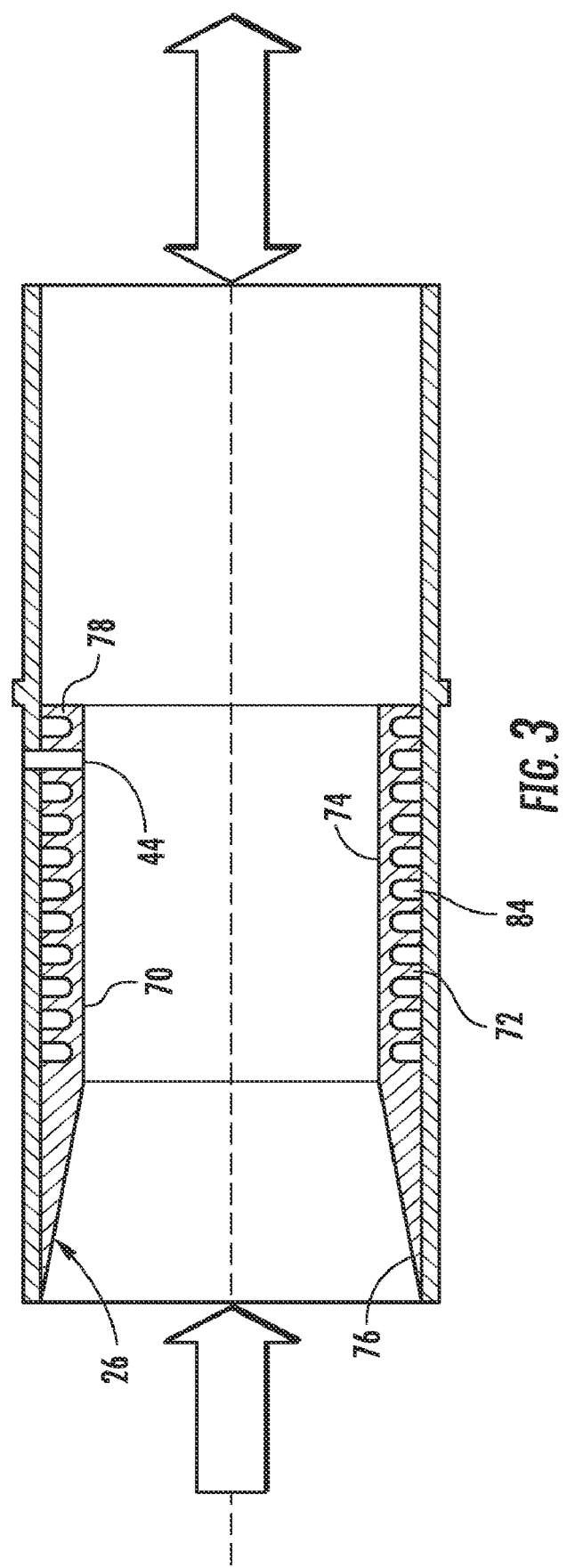
FIG. 3 depicts a cross-sectional view of a flow restrictor insert constructed in accordance with an embodiment of the present invention.
Figure 7:
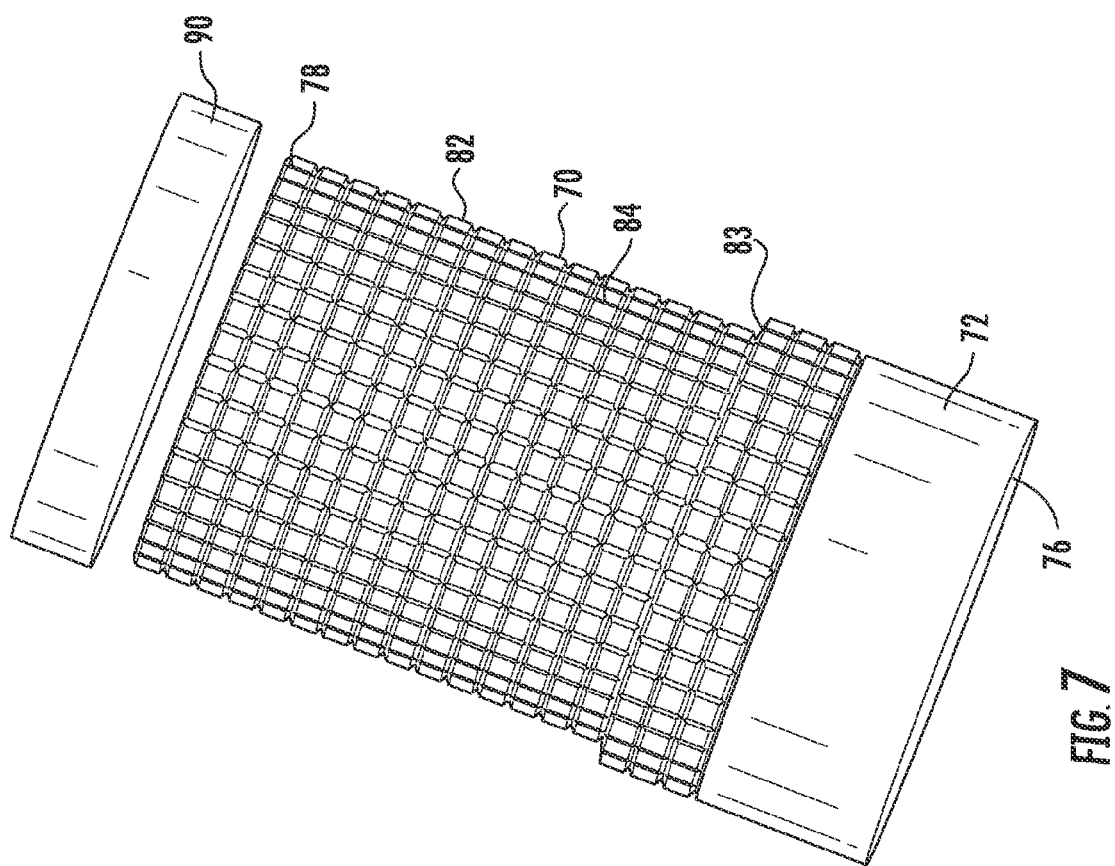
FIG. 7 depicts a perspective, partially exploded view of the flow restrictor insert shown in FIGS. 4 and 5.
Figure 6:
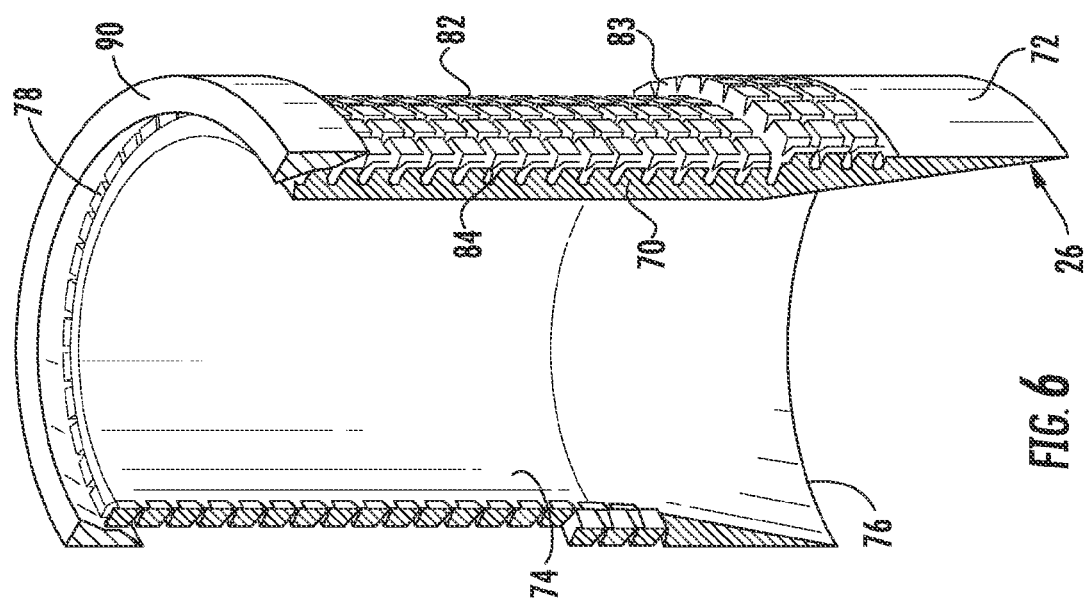
FIG. 6 depicts a perspective view of a portion of the flow restrictor insert depicted in FIGS. 4 and 5.

Referring now to FIG. 3, shown therein is one embodiment of the flow restrictor insert 26. In this embodiment, the flow restrictor insert 26 is formed as a tubular like device having a sidewall 70. The sidewall 70 has an outer surface 72 and an inner surface 74. The outer surface 72 is shaped to mate with the restriction 30 of the differential pressure conduit 7, while the inner surface 74 is shaped so as to restrict the flow of the fluid to cause the differential pressure sensed by the differential pressure measurement device 13 discussed above.

The flow restrictor insert 26 also includes a first end 76 and a second end 78. The flow restrictor insert 26 is designed to be positioned in the restriction 30 such that fluid flowing through the differential pressure conduit 7 also passes through the flow restrictor insert 26 from the first end 76 to the second end 78. To help the fluid flow smoothly through the flow restrictor insert 26, the inner surface 74 is preferably smooth and also preferably tapers inwardly adjacent to the first end 76.

When the flow restrictor insert 26 is to be removed from the restriction 30 as discussed above, the flow restrictor insert 26 is preferably designed to fracture into relatively small particles, for example, between about 1 mm and 10 mm. This can be accomplished in a variety of manners, such as by choosing a material, such as ceramic or glass, that usually fractures into relatively small particles, and/or by weakening the flow restrictor insert 26 in a predetermined manner.

Similar to the embodiment shown in FIG. 3, another embodiment of the flow restrictor insert 26 is shown in FIGS. 4-7 wherein the outer surface 72 of the sidewall 70 is formed to have a recessed portion 82. Advantageously, the recessed portion 82 may be constructed so as to facilitate fracture of the flow restrictor insert 26. In the example shown in FIGS. 4-7, the recessed portion 82 extends from the second end 78 towards the first end 76 and terminates before the first end 76 so as to form a shoulder 83.

In each of the embodiments shown in FIGS. 3-7, the sidewall 70 of the flow restrictor insert 26 is provided with a plurality of grooves 84 (only one of the grooves 84 being numbered for purposes of brevity) arranged in a grid-like pattern to facilitate the fracturing of the flow restrictor insert 26 into particles at least partially surrounded by the grooves 84 in a predetermined manner. The grooves 84 preferably extend from the outer surface 72 toward the inner surface 74. The distance in which the grooves 84 extend from the outer surface 72 to the inner surface 74 can vary depending upon a variety of factors, such as the type of material utilized to construct the flow restrictor insert 26, the expected pressures to which the flow restrictor insert 26 will be subjected to, and/or the size of the internal bore 40. In the example depicted in which the flow restrictor insert 26 is made of a ceramic material, the grooves 84 extend from the outer surface 72 to about three-fourths of the distance between the outer surface 72 and the inner surface 74.

In the embodiment shown in FIGS. 4-7, the flow restrictor insert 26 is provided with a collar 90 positioned adjacent to the second end 78. The collar 90 can be implemented to mate with the restriction 30 of the differential pressure conduit 7. Moreover, the collar 90 may be removable.

It should be understood that the flow restrictor insert 26 can be constructed in a variety of manners. For example, the flow restrictor insert 26 can be a unitary element, or formed of multiple pieces that are connected together in any suitable manner, such as press-fitting, gluing or the like. Further, although the flow restrictor insert 26 has been shown and described as a tubular like device, the flow restrictor insert 26 could be formed in a variety of manners, such as a restrictor insert for an orifice plate positioned in the differential pressure conduit 7. In this case the first pressure measuring station 32 is positioned upstream of the restrictor insert, and the second pressure measuring station 34 is positioned downstream of the restrictor insert.

Although the present invention has been described with reference to exemplary embodiments and implementations thereof, the present invention is not to be limited by or to such exemplary embodiments and/or implementations. Rather, the systems and methods of the present invention are susceptible to various modifications, variations and/or enhancements without departing from the spirit or scope of the present invention. Accordingly, the present invention expressly encompasses all such modifications, variations and enhancements within its scope.

What is claimed is:

1. A flow rate device for measuring the flow rate of a fluid flowing through a wellbore, the flow rate device comprising:
   a differential pressure conduit locatable in the wellbore, the differential pressure conduit defining an internal bore and adapted to include a restriction to increase the velocity of fluid flowing through the differential pressure conduit to create a differential pressure, the differential pressure conduit defining first and second pressure measuring stations axially spaced along the differential pressure conduit, the restriction having a cross-sectional area;
   a flow restrictor insert located in the restriction to reduce the cross-sectional area of the restriction, the flow restrictor insert defining an internal bore having a cross-sectional area less than the cross-sectional area of the restriction, the flow restrictor insert having a pressure measuring port aligned with the second pressure measuring station; and
   a differential pressure measurement device having at least one pressure sensor for detecting the pressure at the first pressure station, and detecting the pressure at the second pressure station to generate a signal indicative of the flow rate of the fluid.

2. The flow rate device of claim 1, wherein the differential pressure conduit further comprises a Venturi.

3. The flow rate device of claim 1, wherein the differential pressure conduit further comprises an orifice plate.

4. The flow rate device of claim 1, wherein the flow restrictor insert is destroyable.

5. The flow rate device of claim 1, wherein the flow restrictor insert includes a sidewall having a lower section defining an upwardly tapering portion of the internal bore.

6. The flow rate device of claim 1, wherein the flow restrictor insert has a sidewall with an outer surface defining a plurality of grooves in a grid-pattern.

7. The flow rate device of claim 1, wherein the at least one pressure sensor of the differential pressure measurement device is defined further as first and second pressure sensors with the first pressure sensor measuring the pressure at the first pressure station, and the second pressure sensor measuring the pressure at the second pressure station for generating a signal indicative of the flow rate of the fluid.

8. The flow rate device of claim 7, wherein the first and second pressure sensors are defined further as absolute pressure sensors measuring the local pressure of the fluid.

9. The flow rate device of claim 1, wherein the at least one pressure sensor of the differential pressure measurement device is defined further as a differential pressure sensor adapted to measure the difference between the pressure at the first pressure station and the pressure at the second pressure station for generating a signal indicative of the flow rate of the fluid.

10. A method for monitoring the flow rate of a fluid in a hydrocarbon well, comprising the steps of:
    installing a flow restrictor insert of a flow rate device in a restriction of a differential pressure conduit;
    placing the differential pressure conduit within the hydrocarbon well;
    measuring the flow rate of the fluid with the flow rate device as the fluid passes through the differential pressure conduit;
    removing the flow restrictor insert while the differential pressure conduit is within the hydrocarbon well and without disabling the flow rate device; and
    passing a tool through the restriction of the differential pressure conduit.

11. The method of claim 10, wherein the step of removing the flow restrictor insert is defined further as breaking the flow restrictor insert into a plurality of particles such that particles formed from the flow restrictor are removed from the restrictor by the fluid.

12. A flow rate device for measuring the flow rate of a fluid flowing through a wellbore, the flow rate device comprising:
    a differential pressure conduit locatable in the wellbore defining an internal bore, and adapted to include a restriction to increase the velocity of fluid flowing through the differential pressure conduit to create a differential pressure, the differential pressure conduit defining first and second pressure measuring stations axially spaced along the differential pressure conduit, the restriction having a cross-sectional area;
    a flow restrictor insert located in the restriction to reduce the cross-sectional area of the restriction, the flow restrictor insert defining an internal bore having a cross-sectional area less than the cross-sectional area of the restriction, the flow restrictor insert adapted to be destroyed for evacuation from the restriction; and
    a differential pressure measurement device having at least one pressure sensor for detecting the pressure at the first pressure station, and detecting the pressure at the second pressure station to generate a signal indicative of the flow rate of the fluid.

13. The flow rate device of claim 12, wherein the flow restrictor insert includes a sidewall having a lower section defining an upwardly tapering portion of the internal bore.

14. The flow rate device of claim 12, wherein the flow restrictor insert includes a sidewall having an outer surface defining a plurality of grooves in a grid-pattern.

15. The flow rate device of claim 12, wherein the at least one pressure sensor of the differential pressure measurement device is defined further as first and second pressure sensors with the first pressure sensor measuring the pressure at the first pressure station, and the second pressure sensor measuring the pressure at the second pressure station for generating a signal indicative of the flow rate of the fluid.

16. The flow rate device of claim 15, wherein the first and second pressure sensors are defined further as absolute pressure sensors measuring the local pressure of the fluid.

17. The flow rate device of claim 12, wherein the at least one pressure sensor of the differential pressure measurement device is defined further as a differential pressure sensor adapted to measure the difference between the pressure at the first pressure station and the pressure at the second pressure station for generating a signal indicative of the flow rate of the fluid.

* * * * *